June 13, 1944.                N. H. RICKER                2,351,456
                          SEISMIC PROSPECTING
                    Filed Aug. 29, 1941          2 Sheets-Sheet 1
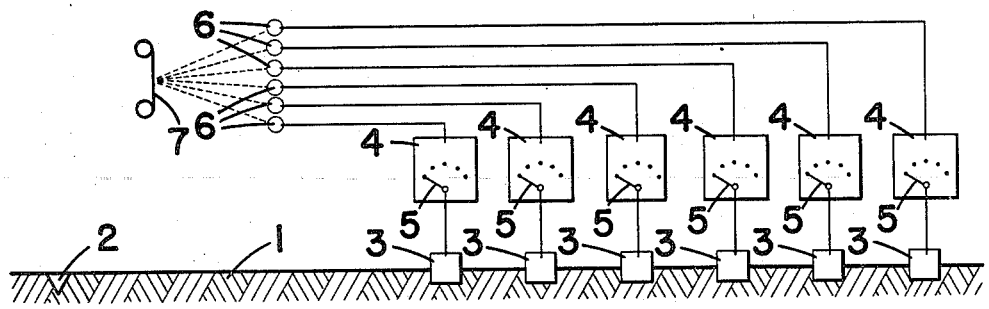
FIG. 1.
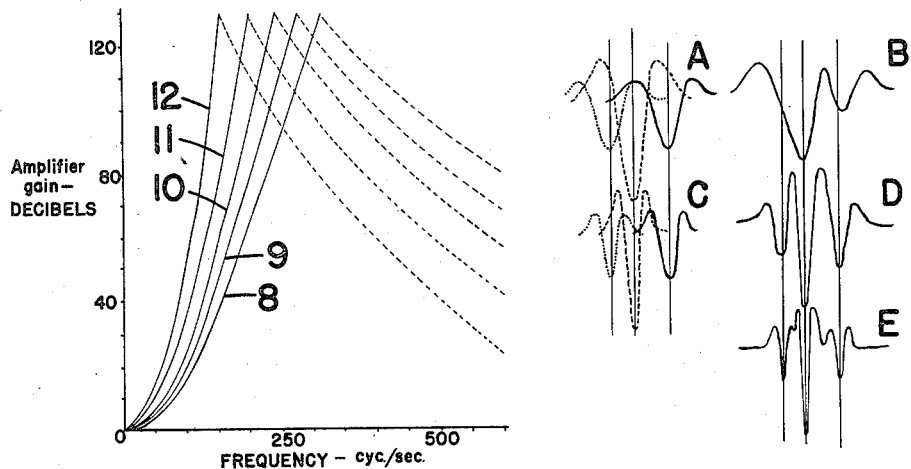
FIG. 2.
FIG. 3.
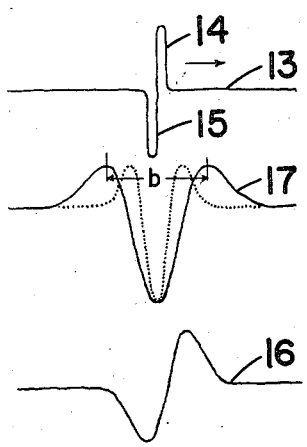
FIG. 4.
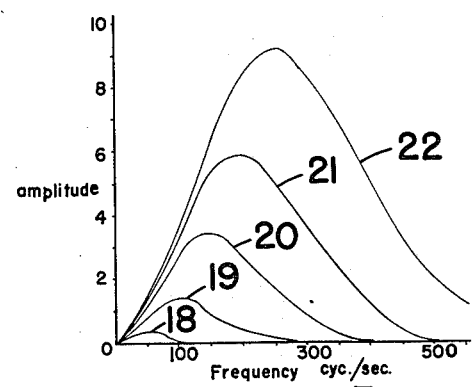
FIG. 5.
Norman H. Ricker INVENTOR.
BY  P. J. Whelan
                    ATTORNEY

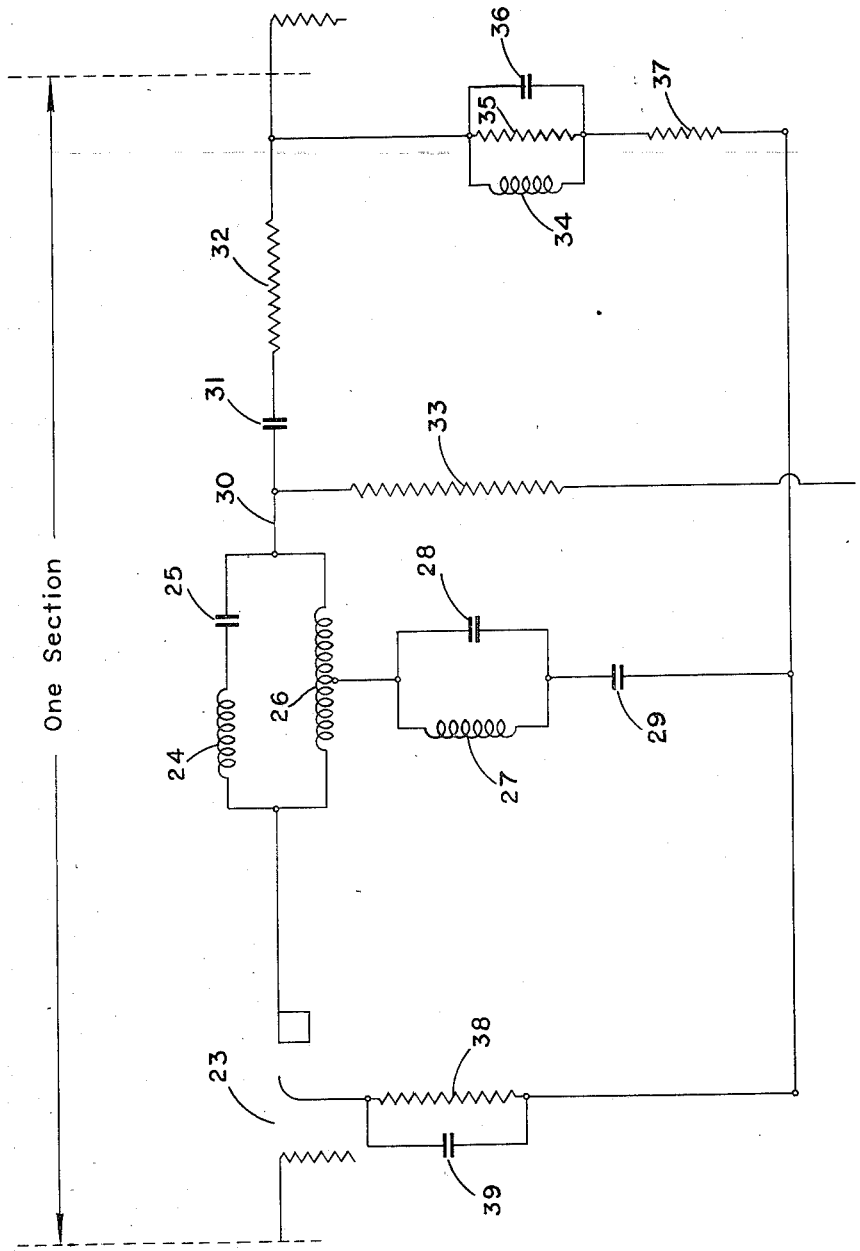

Patented June 13, 1944

2,351,456

UNITED STATES PATENT OFFICE

2,351,456

SEISMIC PROSPECTING

Norman H. Ricker, Tulsa, Okla., assignor to Standard Oil Development Company, a corporation of Delaware Application August 29, 1941, Serial No. 408,775

5 Claims. (Cl. 177—352)

The present invention is directed to seismic prospecting in which reflections and refractions from substrata are studied to determine the depths of such substrata.

In seismic prospecting a sharp impulse is imparted to the earth and the waves resulting therefrom, after being reflected and/or refracted from substrata, are received at suitably spaced points where they are converted into electrical waves which can be recorded. The energizing impulse contains a large amount of high frequency components which are absorbed in a large degree by the earth. As a result, the recorded waves are flattened out, with an attending spread, which makes it difficult to identify reflections, and causes reflections from close reflecting layers to overlap.

This attenuation of high frequencies has been recognized and it has been proposed to use in the receiving apparatus filter circuits which will accentuate the high frequency components in the recorded waves. This proposal, however, was accompanied by the prescription of means in the receiving apparatus to change the phase relationship of the high and low frequency waves based on the theory that high frequencies travel through the earth at greater velocity than low frequencies.

It has now been found that, while dispersion of waves of high frequencies traveling through the earth may be expected, waves of all frequencies in the range encountered in seismic prospecting travel through the ground at substantially the same velocity so that all such waves arriving at a pickup from any given reflecting layer have the same phase relationship as that which obtained at the reflecting layer. This is evident from the peaks which characterize reflections and the effect which a change in phase of the various frequency components of the waves will have on these peaks. Any change in the phase relationship of the various frequency components of waves reflected from a given substratum has a tendency to lower these peaks. Thus, the useful effect of emphasizing the high frequency components of these waves is offset by changing the phase relationship of the components of different frequencies.

According to the present invention, the width of reflections of seismic records is decreased and their amplitude increased by passing the currents generated by the pickups through an amplifier which amplifies different frequencies to a different degree which in general is proportional to the extent to which these frequencies are absorbed by the earth but which does not change the phase relationship of waves of different frequencies.

To put it another way, this invention has to do with increasing the resolving power of the seismic prospecting methods and is a direct outgrowth from the fundamental seismic studies the results of which have been published in the October 1940 number of "Geophysics," pp. 348 to 366 inclusive, this publication being the official journal of the "Society of Exploration Geophysicists."

As a result of these studies revealed in the paper referred to above it is now possible to set down for the first time the precise manner in which attenuated high frequency components of seismic wavelets must be restored in order to improve the sharpness and defining power of seismograms.

In the paper referred to it was shown that the amplitude of the single frequency components in seismic wavelets decayed with the distance, through absorption according to the decay factor $$e^{+\left(\frac{f}{f_0}\right)^2 kx}$$

where $e$ is the base of natural logarithms.

$$\frac{k}{f_0^2}$$

is a constant of the earth and $f$ is the frequency of the single frequency component. At a definite distance of propagation the various single frequency components have decayed relative to one another by the factor $$e^{-\left(\frac{f}{f_0}\right)^2}$$

where $f_0$ is reference frequency, more or less arbitrary, and which determines the frequency scale. For practical design purposes $f_0$ may be taken as the dominant apparent frequency of the normal seismogram. In practical reflection seismic prospecting with compressional waves $f_0$ will vary from, say, 30 cycles per second to, say, 80 cycles per second, depending on the geographical location at which the studies are being made and on the depth from which reflections are being obtained. However, the scope of this invention is not to be limited to this range of values of $f_0$, nor to compressional waves alone, but is applicable to any waves propagated through the body of the earth.

Now, therefore, knowing that the various single frequency components in a given seismic wavelet have suffered relative attenuation according to the attenuation factor $$e^{-\left(\frac{f}{f_0}\right)^2}$$

these attenuated high frequency components may be restored to their original relative spectral distribution by providing an amplifier whose gain characteristic for various frequencies is of the form $$e^{+\left(\frac{f}{f_0}\right)^2}$$

and which has a so-called "linear phase shift." That is to say, the angular shift in phase is proportional to the frequency. This latter requirement is identical with the statement that all single frequency components of a transient passed through the amplifier must pass through the amplifier in the same absolute time. It is a property of a seismic wavelet that all of its single frequency components are in phase at the wavelet center, and it is essential that this "in phase relation" at the wavelet center be retained as the attenuated high frequency components are brought up according to the amplitude gain characteristic $$e^{+\left(\frac{f}{f_0}\right)^2}$$

A suitable amplifier for use in the practice of the present invention is one having an amplification characteristic $$A = e^{\left(\frac{f}{f_0}\right)^2}$$

in which $e$ is the base of natural logarithms, 2.71828, $f$ is the frequency of any given wave and $f_0$ is a reference frequency which has a value corresponding to what has been generally referred to as the reflection frequency. This can be determined for any given territory by measuring the breadth in seconds of a reflection wavelet, amplified by the conventional flat response amplifier, and substituting this value in the equation $$f_0 = \frac{\sqrt{6}}{\pi} \frac{1}{b}$$

What is meant by the breadth of a wavelet, $b$, is shown on page 364 of the aforesaid paper.

The matter of amplifier-equalizer design as applied to the telephone industry has been the subject of a great amount of development and the art of such design has reached the engineering stage where it is possible to build numerous equalizer circuits which will realize required amplitude and phase specifications. The construction of a particular amplifier, therefore, constitutes no part of the present invention which contemplates rather the use of an amplifier having particular amplyfying characteristics in seismic prospecting. The specification of the characteristics desired is sufficient to enable one skilled in the art to build a suitable amplifier.

The nature of the present invention will be better understood from the following detailed description of the accompanying drawings in which—

Fig. 1 is a schematic illustration of one form of apparatus suitable for the practice of the present invention;

Fig. 2 is a series of curves showing how the amplification characteristic of each amplifier unit changes with the number of sections utilized;

Fig. 3 is an illustration of a plurality of reflected waves showing how reflections are brought out by narrowing the wavelets;

Fig. 4 is an illustration of the manner in which the impulse is distorted by passage through the ground and through the electrical receiving circuit;

Fig. 5 is a family of curves showing how the frequency spectra of the waves varies with distance from the source; and Fig. 6 is a diagrammatic sketch of one section of an amplifier suitable for use in the practice of the present invention.

Referring to Fig. 1 in detail, numeral 1 designates the surface of the earth, on which is indicated a shot point, 2. Numeral 3 indicates a pickup capable of converting mechanical vibrations into electrical oscillations. There are any desired number of these pickups, which are usually arranged in alignment with the shot point and are spaced at a distance from the shot point suitable for the reception of the waves which are to be studied. The output of each pickup is delivered to an amplifier 4. Each of these amplifiers is made up of a plurality of sections. Each section has an amplification characteristic such that the amplification characteristic of all the sections satisfies the equation $$A = e^{\left(\frac{f}{f_0}\right)^2}$$

As previously explained, $f_0$ corresponds to the reflection frequency which can be determined for any area. By providing a plurality of sections as indicated, almost any desired value of $f_0$ can be realized by varying the number of sections in the circuit. To explain the matter more fully, each section has an amplification characteristic satisfying the equation $$A = e^{\left(\frac{f}{f_1}\right)^2}$$

where $f_1$ is that frequency at which the amplification equals 2.71828. When more than one section is used, the amplification of the combination is the product of the individual amplifications, in which case $$\frac{1}{f_0^2}$$

equals the sum of the inverse squares of the values of $f_1$ for the individual sections. As shown in the drawings, there are five sections in each amplifier, and the number of sections used can be regulated by adjusting the position of arm 5.

In Fig. 6 is shown a suitable circuit for each section of an amplifier which may be used in the practice of the present invention. In this circuit numeral 23 indicates a vacuum tube, which may be either a 6J5 or a 6F8G, to the plate of which is connected a closed loop including a coil 24 and a condenser 25 arranged in parallel with a coil 26. Connected to the latter coil between its terminals is a filter arrangement composed of a coil 27 and a condenser 28 arranged in parallel and connected to the ground through a condenser 29. A conductor 30 connects the closed loop to the grid of another vacuum tube the same as that designated by numeral 23, which represents the beginning of the next section. In this conductor are arranged in series a condenser 31 and a resistor 32. The conductor is connected to a voltage supply through a resistor 33. The conductor is also connected to the ground behind resistor 32 through a filter arrangement including an inductance coil 34, a resistor 35 and a condenser 36, while between this filter arrangement and the ground there is arranged an additional resistor 37. The cathode of tube 23 is connected to the ground through a resistor 38, across which is connected a condenser 39.

In a practical unit embodying this circuit, the various elements may have the following values: element 24, 148 HY; element 25, 0.037 mf.; element 26, 510 HY; element 27, 26.6 HY; element 28, 0.165 mf.; element 29, 0.472 mf.; element 31, 4 mf.; element 32, 392,000 ohms; element 33, 30,000 ohms; element 34, 45.8 HY; element 35, 512 ohms; element 36, 0.043 mf.; element 37, 10,000 ohms; element 38, 601 ohms; element 39, 5,000 mf.; and the voltage supply connected to resistor 33, 180 volts.

The output of each amplifier is delivered to a galvanometer 6. These galvanometers are arranged in a battery in such a way that their beams play on a traveling strip of sensitized paper 7 in a manner conventional in the art.

In Fig. 2 is shown a series of curves representing the amplifier gain which may be realized by utilization of different numbers of sections of each amplifier unit as shown in Fig. 1. In these curves, the ordinates represent amplifier gain and the abscissae represent frequencies. Curve 8 represents the amplifier gain when a single section is employed, having a $f_1$ equals 80 cycles, which in turn would represent $f_0$. With this single section, the amplifier would be peaked at slightly above 300 cycles. This single section would effect contraction of an 80-cycle reflection. Each reflection contains all frequencies, but some one frequency will have the maximum amplitude, and it is this frequency by which the reflection is characterized and which corresponds to $f_0$.

If the second section be given a characteristic such that $f_1$ equals 144.59, the $f_0$ for the first and second sections will then be 70 cycles, by virtue of the relationship $$e^{\left(\frac{f}{80}\right)^2} e^{\left(\frac{f}{144.59}\right)^2} = e^{\left(\frac{f}{f_0}\right)^2}$$

The amplification characteristic of the first and second sections then, therefore, will be that indicated by numeral 9, which would be used for a 70-cycle reflection. In like manner, the value of $f_1$ for the succeeding sections can be regulated to give a $f_0$ of 60 cycles for a combination of three sections, indicated by numeral 10, and $f_0$ of 50 cycles for a combination of four sections, indicated by numeral 11, and a $f_0$ of 40 cycles for all five sections, indicated by numeral 12. It will be seen, therefore, that by varying the number of sections and the value of $f_1$ for each section, any desired value of $f_0$ can be obtained.

In Fig. 3 is shown a series of wave forms demonstrating the effect which contraction of wavelets has on the resolution of a reflecting complex. Wave group A represents three overlapping wavelets delivered by a pickup. One of these wavelets is indicated by a solid line, the second by a dotted line, and the third by a dashed line. Wave B represents the sum of these three wavelets. It will be noted that the trough of the dotted line wavelet is completely lost by being combined with the other two wavelets.

Wave group C corresponds to wave group A with the centers of the three wavelets remaining fixed, but with each wavelet contracted to one-half of its original breadth. Wave form D, representing the composite of the three wavelets in group C, now includes the trough of the dotted line wavelet and makes evident the presence of the three wavelets. The centers of these three wavelets, in their composite form, however, still do not occupy quite the same position as they occupied in wavelet group C. By again contracting the breadth of each wavelet to one-half its breadth in group C, wave complex E is produced, in which the center of each wavelet of the group occupies the same position it occupied in group C. Thus, in complex E, the individual wavelets are clearly brought out in the relationship they actually occupied.

In order to demonstrate the attenuation which a wave undergoes between the time of its generation and the time it is recorded, there is shown in Fig. 4 a number of wave forms. Numeral 13 designates the wave form of the impulse as it is generated at the shot point. It will be seen that this is a sharp impulse, including a sharp compressional portion 14, followed by a sharp rarefaction portion 15. The form of the wave as it arrives at a receiving station after passage through the earth is indicated by numeral 16. Both portions of the impulse have been broadened out. The type of wave form shown in 16 is that which would be recorded by a mechanical seismograph. This wave, in being converted into an electrical wave by the pickup, assumes the form indicated by numeral 17. In dotted lines is shown the form which wave 17 would have if contracted to one-half its breadth. A full discussion of these wavelet forms may be found in the paper entitled "The form and nature of seismic waves and the structure of seismograms," published in "Geophysics," volume 5, No. 4, October, 1940, pages 348–366.

In Fig. 5 is shown a plurality of frequency spectra of a wavelet form delivered by a geophone at different distances from the point of creation. In these spectra the ordinates indicate amplitudes and the abscissae are in terms of frequency. Curve 18 may be taken as the spectrum of a wavelet at any selected distance from the shot point, say for example 400 feet. It will be seen that the frequency at maximum amplitude in this spectrum is about 50 cycles. The curve designated by numeral 19 represents the spectrum of the wavelet at a distance of 100 feet from the point of creation, where the frequency of maximum amplitude is about 100 cycles. Numeral 20 designates a curve representing the spectrum at a distance of about 44 feet from the point of creation. In this case the frequency of maximum amplitude is about 150 cycles. The curve designated by the numeral 21 represents the spectrum of the wavelet at a distance of about 25 feet from the point of creation. In this case the frequency of maximum amplitude is 200 cycles. Numeral 22 designates the spectrum of the wavelet at a distance of sixteen feet from the point of creation. In this case the frequency of maximum amplitude is 250 cycles. It is to be understood that each of these spectra includes not only the frequencies in the range shown, but even higher frequencies. That is to say, the spectrum 18 includes frequencies up to and exceeding 500 cycles, but the amplitude of these frequencies is so small that they are not discernible on the drawing. By suitable amplification any of these frequencies can be brought out on spectrum 18. According to the present invention, a wavelet having a spectrum indicated by numeral 18 can, by suitable amplification, be made to have a spectrum simulating that designated by numeral 19, or numeral 20, etc. Such a change in the spectrum is effected by the use of amplifiers having an amplification characteristic such as those indicated by Fig. 2.

From a consideration of the sepectra shown in Fig. 5 can be appreciated that as the distance from the point of creation increases, the wave breadth changes considerably. Since the various frequencies are in phase at the wavelet center, this center does not change but, because of the broadening of the wavelet and the consequent overlapping of wavelets from adjacent reflection layers, the center of the wavelet becomes more and more difficult to find as the distance from the point of creation increases. It is by restoring to the wavelet the proper amplitude relationships of the various frequencies included therein without changing the phase relationships of these frequencies that the wavelet is contracted and its center made easily identifiable. As has been previously stated, this restoration of the amplitude relationships of the various frequencies included in the wavelet is effected according to the present invention by subjecting the wavelet delivered by the pickup or geophone to amplification, which has an amplifying effect on the individual frequencies proportional to the degree of absorption of these frequencies by the earth.

The more closely the degree of amplification of any given frequency is brought into correspondence with the degree of absorption of that frequency by the earth, the more closely the recorded wavelet will be made to simulate the original wavelet at its point of generation.

The nature and objects of the present invention having been thus described and illustrated, what is claimed as new and useful and is desired to be secured by Letters Patent is:

1. In seismic prospecting in which seismic waves are introduced into the ground at a selected point, received at other points selected in the path of said waves from substrata and converted into electrical impulses, the steps which comprise amplifying the different frequencies of said impulses to a different degree proportional to the absorption of said frequencies by the earth while maintaining the phase relationship between said frequencies, and recording the amplified impulses.

2. In seismic prospecting in which seismic waves are introduced into the ground at a selected point, received at other points selected in the path of said waves from substrata and converted into electrical impulses, the steps which comprise amplifying the different frequencies of said impulses by passing them through an amplifier having an amplification characteristic.

$$A = e^{\left(\frac{f}{f_0}\right)^2}$$

in which $e$ is the base of natural logarithms, 2.71828, $f$ is the frequency of any given wave and $f_0$ is a reference frequency having a value corresponding to the reflection frequency, and recording the amplified impulses.

3. An apparatus for recording seismic waves comprising a detector for said waves including means for converting said waves into electrical oscillations, means for amplifying the different frequencies of said oscillations to a different degree proportional to the absorption of said frequencies by the earth while maintaining the phase relationship between said frequencies, and means for recording the amplified oscillations.

4. An apparatus for recording seismic waves comprising a detector for said waves including means for converting them into electrical oscillations, an amplifier for said oscillations having an amplification characteristic $$A = e^{\left(\frac{f}{f_0}\right)^2}$$

in which $e$ is the base of natural logarithms 2.71828, $f$ is the frequency of any given wave, and $f_0$ is a reference frequency having a value corresponding to the reflection frequency, and means for recording the amplified oscillations.

5. An apparatus for recording seismic waves comprising a detector for said waves including means for converting them into electrical oscillations, an amplifier for said oscillations having an amplification characteristic $$A = e^{\left(\frac{f}{f_0}\right)^2}$$

in which $e$ is the base of natural logarithms 2.71828, $f$ is the frequency of any given wave, and $f_0$ is a reference frequency having a value corresponding to the reflection frequency, while at the same time having a linear phase shift characteristic and means for recording the amplified oscillations.

NORMAN H. RICKER.

Certificate of Correction

Patent No. 2,351,456                                                          June 13, 1944

NORMAN H. RICKER

It is hereby certified that error appears in the printed specification of the above numbered patent requiring correction as follows:

Column 2, lines 23 to 25, for the formula reading $$\text{``}e^{+\left(\frac{f}{f_o}\right)^2 kx\text{''}} \qquad \text{read} \qquad e^{-\left(\frac{f}{f_o}\right)^2 kx}$$

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*